United States Patent

[11] 3,594,999

| [72] | Inventor | Basil W. Savage |
| | | Route 1, Madill, Okla. 73446 |
| [21] | Appl. No. | 17,083 |
| [22] | Filed | Mar. 6, 1970 |
| [45] | Patented | July 27, 1971 |

[54] TREE SHAKER
15 Claims, 8 Drawing Figs.

[52] U.S. Cl. ............................................. 56/328 TS
[51] Int. Cl. ............................................. A01g 19/08
[50] Field of Search ................................... 56/328 TS, 329

[56] References Cited
UNITED STATES PATENTS

| 2,656,669 | 10/1953 | Avansino | 56/328 TS |
| 3,020,695 | 2/1962 | Gould et al. | 56/328 TS |
| 3,220,268 | 11/1965 | Brandt, Jr. | 56/328 TS UX |
| 3,479,806 | 11/1969 | Pool et al. | 56/328 TS |

*Primary Examiner*—Louis G. Mancene
*Assistant Examiner*—J. N. Eskovitz
*Attorneys*—Clarence A. O'Brien and Harvey B. Jacobson ABSTRACT: A tractor-mountable shaker for nut and fruit trees including power-driven oppositely swinging eccentric weights mounted within a casing which is in turn chain clamped directly to the trunk of a tree to be shaken. The shaker is suspended from a tractor-mounted boom and is driven from the tractor power takeoff. The tree-clamping chain is hydraulically manipulated for effecting a snug engagement of the shaker against the tree.

PATENTED JUL 27 1971

Basil W. Savage
INVENTOR

BY Clarence A. O'Brien
and Harvey B. Jacobson
Attorneys

Basil W. Savage
INVENTOR.

Basil W. Savage
INVENTOR.

BY Clarence A. O'Brien
and Harvey B. Jacobson
Attorneys

PATENTED JUL27 1971
3,594,999
SHEET 4 OF 4
Fig. 5
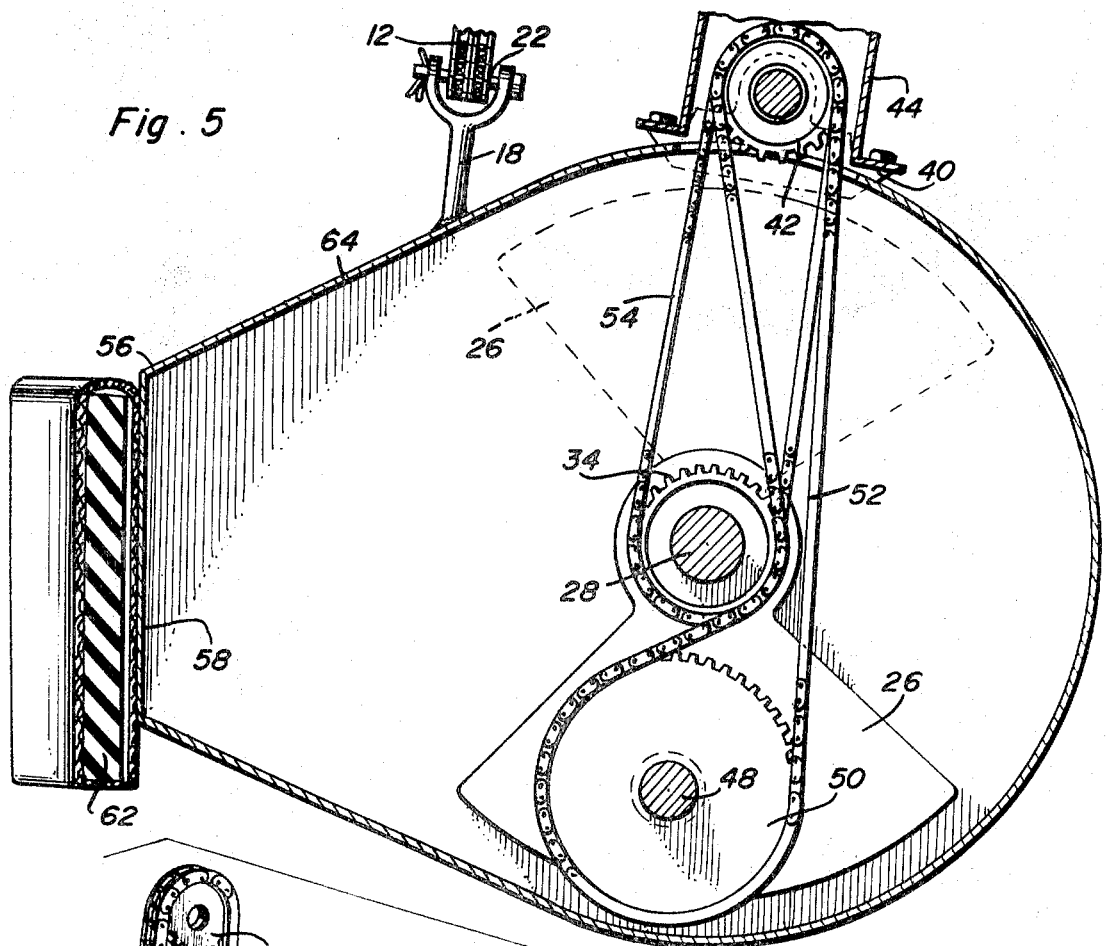
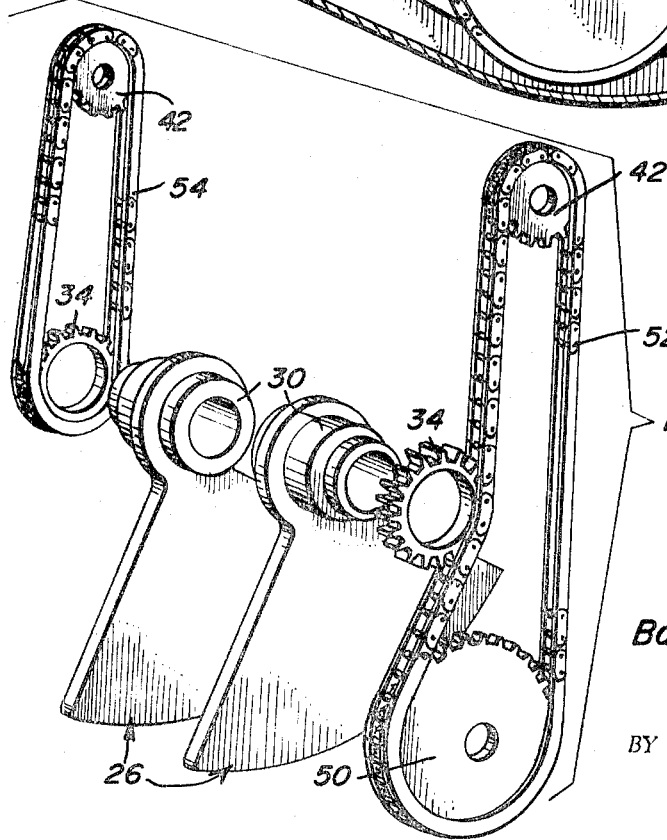
Fig. 8
Basil W. Savage
INVENTOR.
BY Clarence A. O'Brien
and Harvey B. Jacobson
Attorneys

TREE SHAKER

The instant invention is generally concerned with tree shakers, and more particularly relates to a tractor-mountable tree shaker adapted for mounting on substantially any conventional tractor incorporating a hydraulic system and a power takeoff.

While tree shakers of various types are known, such known shakers incorporate one or more undesirable characteristics, for example poor maneuverability, high initial cost, damaging to the unit mounting the shaker, as well as the tree being shaken, and/or difficult to maintain. Accordingly, it is a primary object of the instant invention to provide a unique tree shaker which avoids all of the above disadvantages and provides a highly practical and efficient unit.

More particularly, the tractor of the instant invention is adapted to be chain suspended from a rearwardly directed tractor-mounted boom, thereby providing a shaker which incorporates all of the maneuverability of the tractor itself and which, due to the chain suspension thereof, will not transfer any of the vibrations thereof to the tractor.

Furthermore, the shaker incorporates a clamping apparatus, including a canvas-covered rubber pad, which enables a tight clamping of the shaker against the tree whereby the vibrations are introduced directly into the tree for effecting a positive shaking of the tree in a manner wherein the tree itself experiences no damage.

In addition, the shaker itself is of a simple although highly unique construction, utilizing a pair of oppositely rotating eccentric weights driven from the tractor power takeoff within a protective casing or housing, the internal components being orientated for positive maintenance-free operation.

Basically, the objects of the instant invention are achieved through the provision of a tree shaker which mounts a pair of oppositely rotating sector-shaped eccentric weights within a casing. The weights are driven through the utilization of the power takeoff of a tractor, the tractor itself mounting the shaker at the end of a rearwardly projecting boom. The vibrations generated by the revolving weights are transmitted to the tree by a clamping of the casing, and more particularly an enlarged cushioned pad thereon, directly to the tree by an encircling of the tree with a chain clamp. The chain clamp has the free end thereof selectively engaged with a pivotally mounted arm which is in turn hydraulically controlled so as to effect a positive tightening of the chain about the tree and a rigid engagement of the shaker itself to the tree whereby the full vibratory forces thereof are transmitted directly to the tree.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 5 is a cross-sectional view taken substantially on a plane passing along line 5-5 in FIG. 4;

FIG. 8 is an exploded perspective view of the eccentric weights and the drive train therefor.

Figure 1:
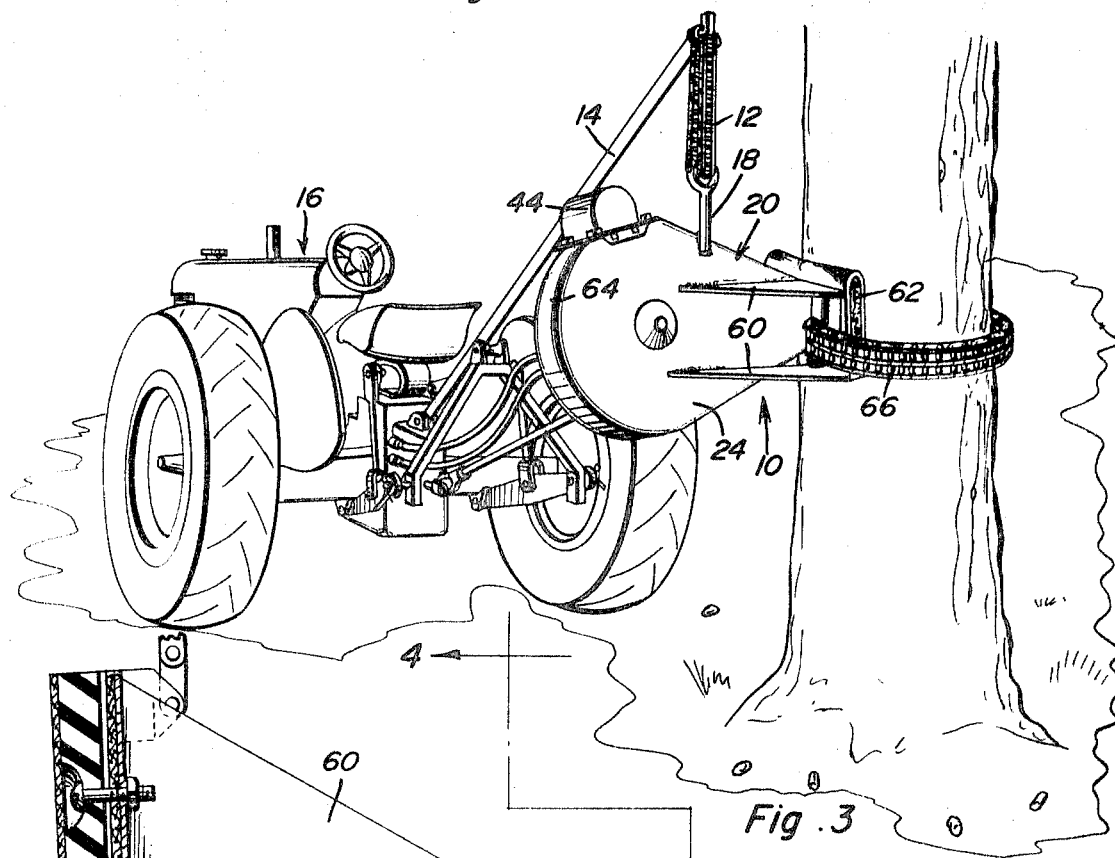
FIG. 1 is a perspective view illustrating the tree shaker of the instant invention in operation.
Figure 3:
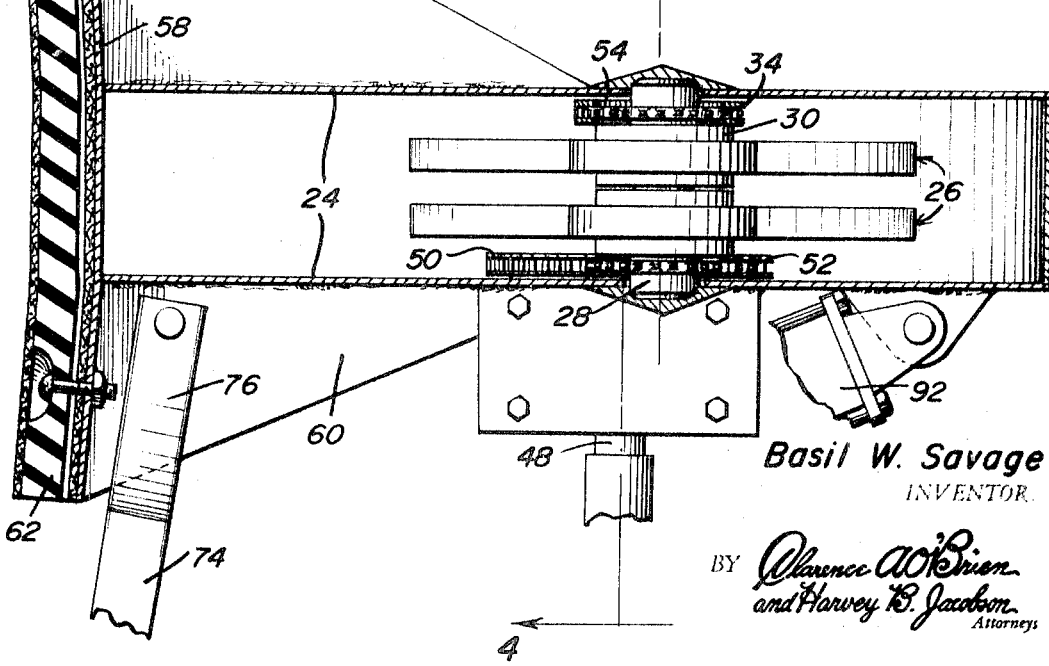
FIG. 3 is an enlarged cross-sectional view taken substantially on a plane passing along line 3-3 in FIG. 2.
Figure 2:
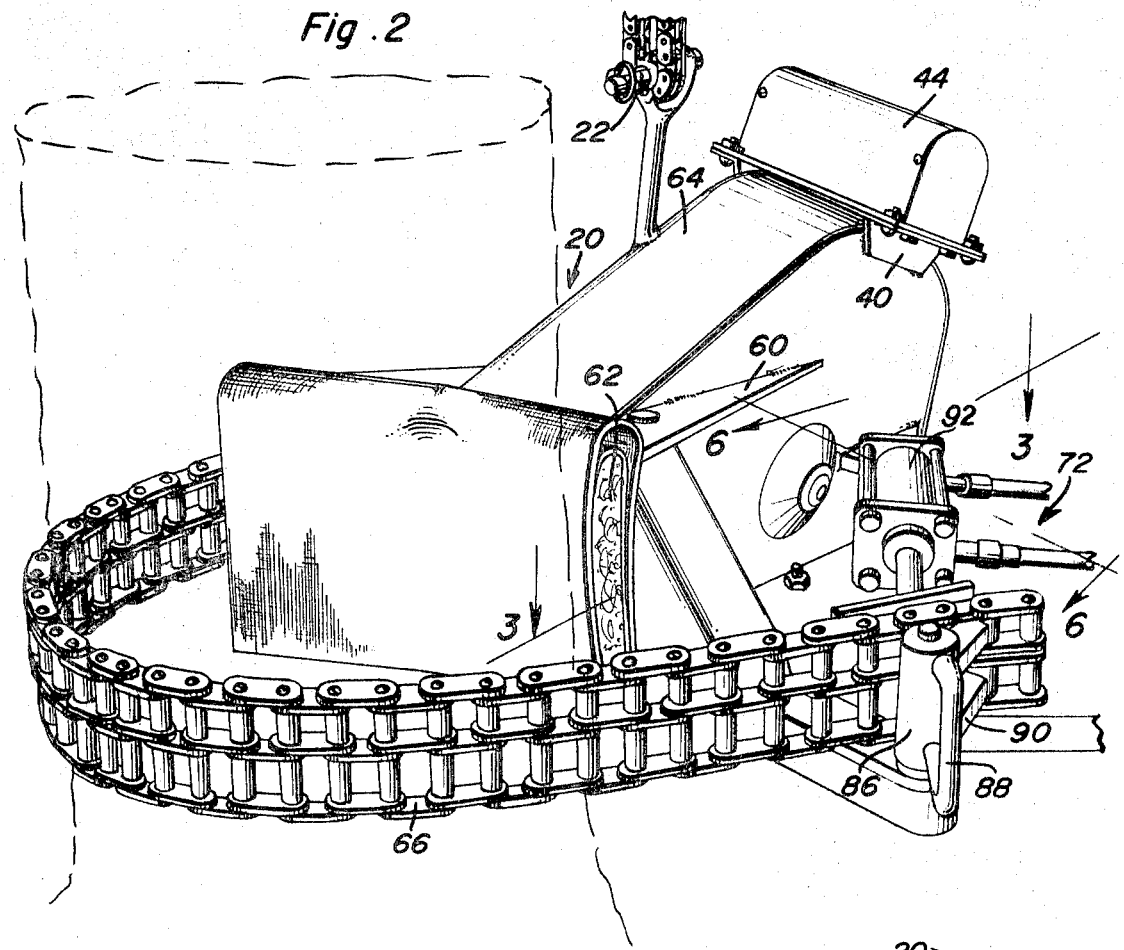
FIG. 2 is an enlarged perspective view of the tree shaker taken from the tree-engaging end thereof.
Figure 6:
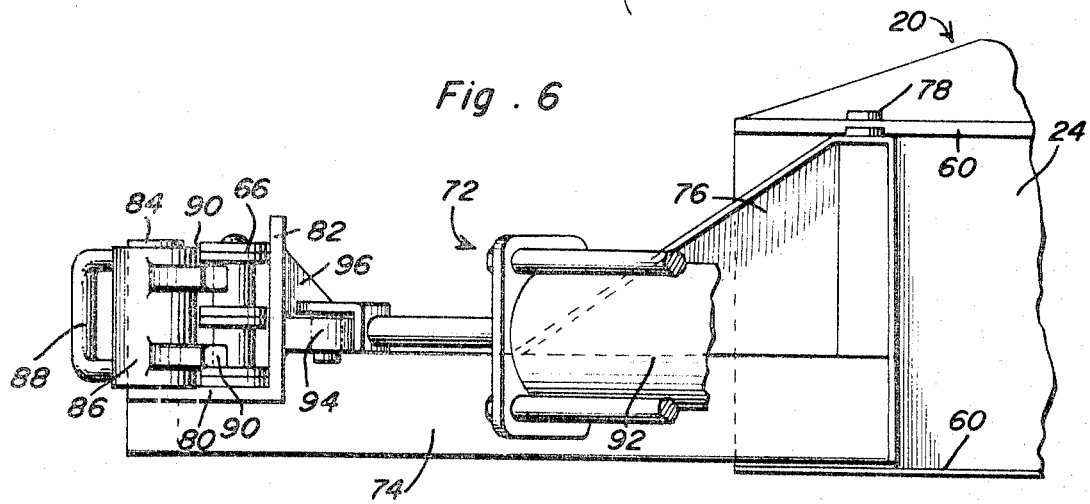
FIG. 6 is a detail view taken generally on a plane passing along line 6-6 in FIG. 2.

Referring now more specifically to the drawings, reference numeral 10 is used to generally designate the shaker comprising the instant invention. The shaker 10, in use, is suspended by a flexible chain or the like 12 from the elevated outer end of an elongated boom 14, the inner end of which is pivotally mounted on the rear of a power supply tractor 16. The boom 14 will preferably engage with the conventionally provided lift apparatus provided on the rear of the tractor 16 so as to enable a variation in the vertical elevation of the tree shaker 10, so as to best accommodate the shaker to any particular tree. The engagement of the shaker suspending chain 12, for example a double-roller chain, requires the provision of a vertical post 18 rigid with the shaker casing or housing 20 and projecting upwardly therefrom, the post 18 having a yokelike upper end which mounts a transverse rod 22 about the chain 12 engages. As will be appreciated, the post 18 is so located as to result in a balanced and generally horizontal orientation of the tree shaker 10.

The casing or housing 20 includes a pair of laterally spaced-parallel sidewalls 24 which receive and mount the vibration causing components therebetween. These components include a pair of sector-shaped eccentric weights 26 both being rotatably mounted on the main shaft 28 fixed to and extending between the opposed walls 24. The weights are independently rotatable on the main shaft 28 and incorporate mounting collars 30 which encircle the main shaft 28 and rotatably engage therewith through appropriate bearing means 32. Each of the collars 30 projects outwardly longitudinally along the shaft 28 and mounts, on the outer end thereof, a weight sprocket 34 which is locked to the collar 30 in a manner whereby upon a rotational driving of the sprocket 34 a corresponding rotation of the associated weight 26 will be effected.

An elongated jackshaft 36, orientated parallel to and in vertically spaced-aligned relation over the main shaft 28, is rotatably mounted between a pair of opposed pillow blocks 38. The pillow blocks 38 are in turn mounted on and bolted to a pair of opposed angle irons 40 welded to the opposed sidewalls 24 and orientated so as to position the jackshaft 36 immediately above the casing 20. The jackshaft 36 fixedly mounts a pair of jackshaft sprockets 42 for rotation therewith, the sprockets 42 aligning with the weight sprockets 34 therebelow. The entire jackshaft unit is enclosed and protected by a dust cover 44 removably bolted to the opposed ends of the support angles 40.

The actual driving of the weights 26 is effected from the tractor power takeoff through a telescoping drive shaft 46. The outer end of the drive shaft 46 is universally connected to a bearing-supported extension shaft 48 mounted on the tractor facing sidewall 24 and extending inwardly thereof. An enlarged drive sprocket 50 is mounted on the inner end of the shaft 48 in a common plane with the overlying aligned weight sprocket 34 and jackshaft sprocket 42. Noting FIGS. 5 and 8 in particular, an endless drive chain 52 engages about the drive sprocket 50 and the aligned overlying jackshaft sprocket 42 with the outer side of one of the vertical runs of the drive chain 52 drivingly engaging with the aligned weight sprocket 34. A second chain 54 extends between and engages about the second jackshaft sprocket 42 and the second weight sprocket 34. Thus, upon a driving of the drive sprocket 50, the weights 26 are rotatably driven about the mainshaft 28 in opposite directions, passing each other at two diametrically opposed points and setting up the vibrations desired so as to effect a shaking of the tree.

The parallel casing sidewalls 24 are, in the area of the rotating weights, generally circular and of a size so as to completely enclose the weights about the rotational path of movement thereof. The upper and lower edges of the casing walls taper forwardly, outwardly of the rotational path of movement of the weights 26, to terminate in a reduced height tree-engaging end 56. In this manner, the vibratory forces of the tree shaker 10, which are transferred through the casing 20, will tend to be concentrated.

Figure 4:
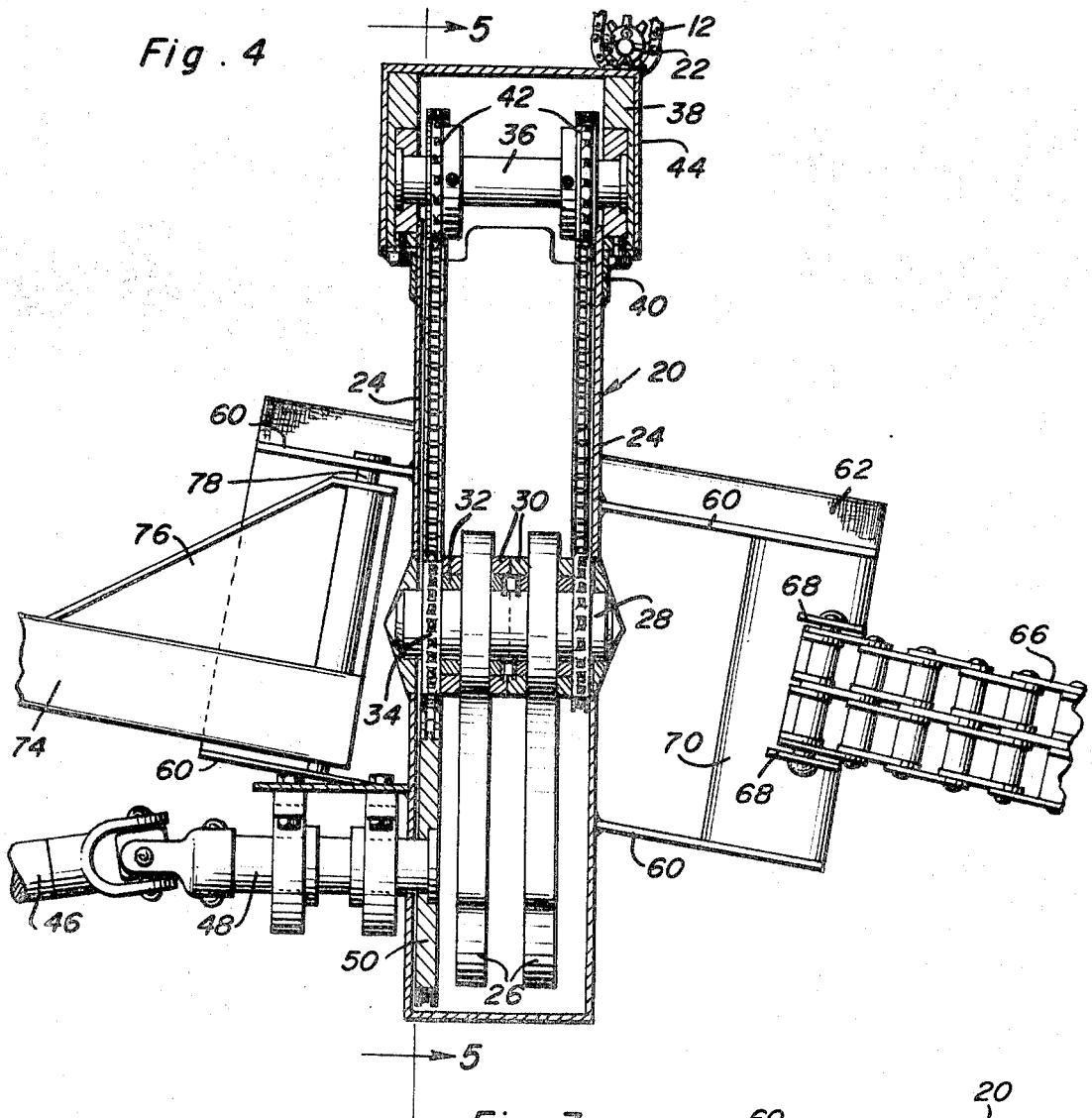
FIG. 4 is a cross-sectional view taken substantially on a plane along line 4-4 in FIG. 3.

The forward end 56 of the shaker casing 20 is provided with a transversely elongated slightly concave mounting plate 58 of equal height with the reduced forward end and rigidly welded thereto. The opposed lateral extensions of the plate 58 beyond the sidewalls 24 of the casing 20 are rigidified by upper and lower triangular rigidifying gusset plates 60. In order to cushion the engagement of the shaker 10 with a tree, and avoid damage to the tree during the shaking operation, a canvas-covered relatively rigid rubber pad 62 is releasably secured, as by bolting, to the mounting panel or plate 58, following the slightly concave configuration thereof so as to properly seat against a tree trunk. Incidentally, noting FIG. 4 in particular, it will be appreciated that the mounting plate 58 and cushioning pad 62 thereon are orientated at an angle varying slightly from 90° relative to the narrow weight-enclosing casing 20. This angular orientation of the tree-engaging portion accommodates the slightly angular orientation of the tractor suspended casing 20 with the power takeoff drive shaft operatively engaged between the tractor and the shaker 10. In other words, during normal operation, the shaker 10 will be slightly angularly oriented which in turn will result in a substantially horizontal positioning of the tree-engaging pad 62, the chain-engaging suspension post 18 on the upper end of the casing 20 being engaged over the outer sidewall 24, relative to the tractor 16, so as to assist in the slight sideways inclination of the shaker 10. Incidentally, in addition to the front end of the casing 20 being closed by the transverse pad-mounting plate 58, the remainder of the casing is completed by an edge wall 64 extending between the peripheral edges of the two sidewalls 24 along the full length of these edges. If so desired, selected portions of this peripheral wall 64 can be removable for purposes of servicing the internal components of the shaker 10.

Figure 7:
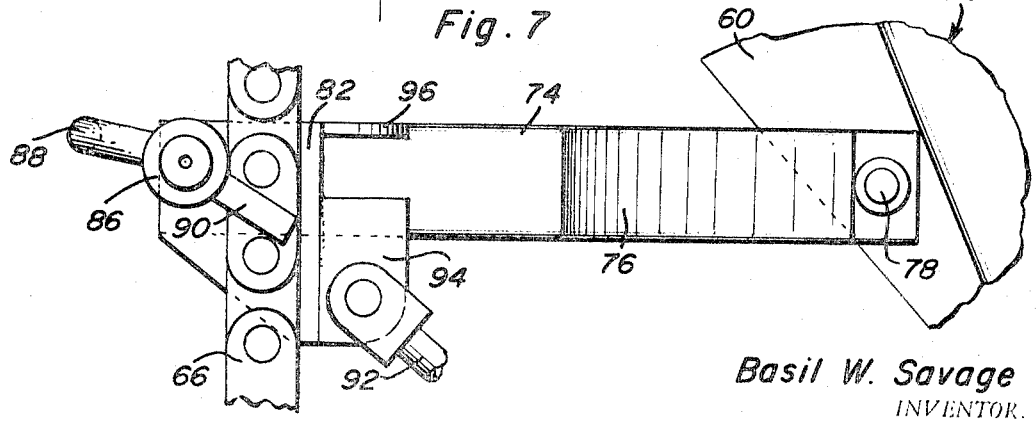
FIG. 7 is a plan view of the structure of FIG. 6.

The shaker 10, in operation, is to be rigidly clamped to a tree to be shaken whereby the full vibratory forces thereof will be transmitted directly to the tree for maximum efficiency in operation. The clamping of the shaker 10 to the tree is effected by a clamping unit including an elongated flexible double-roller chain 66 having one end pivotally mounted between a pair of vertically spaced mounting ears 68 affixed to a pedestal portion 70 extending between the upper and lower gusset plates 60 secured to one of the sidewalls 24. The second end of the roller chain 66 is free for an encircling of the tree trunk therewith and selectively engaged within a chain-tightening unit 72. The tightening unit 72 includes an elongated rigid arm 74 pivotally mounted, at the inner end thereof, between the second pair of vertically spaced gusset plates 60, the inner end of the arm 74 being rigidified by a triangular bracing section 76. The pivotal mounting of the arm 74 is effected by means of a vertically extending pivot pin 78 having the opposite ends thereof journaled in the vertically spaced gusset plates 60 whereby the arm pivots in a horizontal plane. The free outer end of the arm 74 is downwardly stepped and provided with an outwardly directed seat incorporating a horizontal flange 80 and an inwardly spaced vertical back flange 82. A vertical pivot pin or post 84 is affixed to and projects upwardly from the outer end of the horizontal seat-forming flange 80, this post 84 rotatably receiving a vertically elongated sleeve 86 thereover. The sleeve in turn has an outwardly directed enlarged handle 88 and a pair of inwardly directed lugs 90. The lug-mounting sleeve 86 is so orientated relative to the back flange 82 as to allow for, upon an outward swinging of the lugs 90, a free sliding of the double-roller chain 66 therebetween a point whereby a snug embracing of a tree trunk is effected. At this point, the sleeve 86 is rotated, utilizing the handle 88, so as to bring the two lugs 90 into locking or chain catching engagement with a pair of the links of the double-roller chain 66. As will be appreciated from FIG. 7, the lugs 90 are of a length whereby contact with the back flange 82 precludes a withdrawal of the engaged roller chain 66. In this manner, the clamping chain 66 is positively lockable about a tree trunk with the trunk seating against the casing mounted pad 62 through which the vibratory forces are to be transmitted. Once the chain 66 has been snugly positioned about the tree trunk, a final tightening thereof and a corresponding firm clamping of the shaker 10 to the tree trunk is effected by a rearward swinging of the arm 74. This rearward swinging of the arm 74 is provided for by utilizing a power unit in the nature of a hydraulic piston and cylinder 92 supplied from a conventional source of hydraulic fluid normally found on most tractors. The unit 92 has the rear of the cylinder portion thereof pivotally mounted on the adjoining casing sidewall 24 rearwardly of the pivotally mounted inner end of the arm 74. The outer end of the ram is in turn pivotally pinned to a rearwardly projecting ear 94 welded to the rear of the upstanding back flange 82, which flange is additionally rigidified by an appropriate gusset 96 extending between the back flange 82 and the upper surface of the arm 74. When a particular shaking operation has been completed, the piston and cylinder unit 92 is extended so as to generally loosen the chain 66, after which a release of the chain 66 is effected by an outward swinging of the lugs 90 so as to enable a retraction of the chain 66 and a movement of the shaker away from the particular tree. It will be appreciated that the relatively wide nature of the chain 66, in conjunction with the enlarged force-transmitting pad 62, enables a positive nondamaging clamping of the shaker 10 to a tree with the entire force of the activated shaker being transmitted to the tree, the tree itself sustaining no damage such as might be effected were the shaker loosely engaged with the tree or of the type which would subject the tree to repeated blows.

From the foregoing, it will be appreciated that a highly novel tree shaker has been defined, the shaking unit itself being of a relatively narrow easily manipulated construction particularly adapted for mounting on a tractor through a flexible suspension cable whereby no vibratory forces are transmitted to the tractor itself. The shaker includes an enlarged tree seating cushioned forward end which is firmly engaged against a tree by means of a tree-encircling flexible clamping chain. The free end of the chain is selectively engageable within a tightening unit which, through a hydraulic power member, is tightened so as to firmly clamp the shaker unit to the tree in a simple and highly effective manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What I claim as new is as follows:

1. A tree shaker comprising a main shaft, a pair of eccentric weights rotatably mounted on said shaft, drive means for effecting a synchronized driving of said weights in opposite directions about said shaft, a pair of opposed sides mounting said shaft, said sides projecting beyond the path of rotation of said weights and mounting a transversely orientated tree-engaging panel on the outer ends thereof for a transmission of the vibrations caused by the rotating eccentric weights to a tree to be shaken.

2. The shaker of claim 1 including tree-encircling clamp means having opposed end portions engaged with the sides generally adjacent the opposite ends of the tree-engaging panel.

3. The shaker of claim 2 wherein said clamp means includes a tree-encircling elongated flexible member, pivot means pivotally securing one end portion of said flexible member to a first one of said sides, and tightener means adjustably securing the second end portion of said flexible member to the second side.

4. The shaker of claim 3 wherein said tightener means comprises an arm pivotally mounted on said second side and projecting outwardly therefrom catch means on the outer end of said arm for selective locked engagement with the second end portion of said flexible member, and power means engaged between said second side and said arm for effecting a pivotal movement of said arm and a tightening of the catch means locked flexible member.

5. The shaker of claim 4 wherein said drive means comprises a drive sprocket, means for driving said drive sprocket, a pair of weight sprockets, one fixed to each weight, a jackshaft overlying said main shaft in spaced-parallel relation thereto, said jackshaft mounting first and second jackshaft sprockets, a drive chain engaged about and extending between the drive sprocket and the first jackshaft sprocket, said drive chain, between the drive sprocket and the first jackshaft sprocket, engaging one of said weight sprockets for effecting a rotation thereof along with the corresponding weight, and a second chain engaged about and extending between the second jackshaft sprocket and the second weight sprocket for a rotational driving thereof.

6. The shaker of claim 5 including an enlarged casing enclosing said weights, sprockets and chains, said sides comprising portions of said casing, and means for mounting said shaker on a vehicle including flexible suspension means engaged with said casing at a central point with the weight of the shaker generally equally distributed to each side of the flexible suspension member.

7. The shaker of claim 6 wherein said sides comprise parallel flat sidewalls, laterally projecting plate means fixed to said sidewalls adjacent said tree-engaging panel, said tree-engaging panel projecting transversely beyond the opposed sidewalls to define a wide tree-engaging face, said plate means engaging between said sidewalls and said panel and mounting said panel.

8. The shaker of claim 7 wherein said tree-encircling flexible member comprises a link chain, said catch means including pivotally mounted lug means selectively engageable within selected links of said link chain.

9. The shaker of claim 4 wherein said tree-encircling flexible member comprises a link chain, said catch means including pivotally mounted lug means selectively engageable within selected links of said link chain.

10. The shaker of claim 1 wherein said drive means comprises a drive sprocket, means for driving said drive sprockets, a pair of weight sprockets, one fixed to each weight, a jackshaft overlying said main shaft in spaced-parallel relation thereto, said jackshaft mounting first and second jackshaft sprockets, a drive chain engaged about and extending between the drive sprocket and the first jackshaft sprocket, said drive chain, between the drive sprocket and the first jackshaft sprocket, engaging one of said weight sprockets for effecting a rotation thereof along with the corresponding weight, and a second chain engaged about and extending between the second jackshaft sprocket and the second weight sprocket for a rotational driving thereof.

11. The shaker of claim 10 including an enlarged casing enclosing said weights, sprockets, and chains, said sides comprising portions of said casing, and means for mounting said shaker on a vehicle including flexible suspension means engaged with said casing at a central point with the weight of the shaker generally equally distributed to each side of the flexible suspension member.

12. A tree shaker comprising a vibration effecting apparatus, said apparatus being enclosed within a casing and mounted for a transmission of the vibration to said casing, said casing having a forward tree-engaging end, clamp means mounted on said casing adjacent said forward tree-engaging end, said clamp means including a flexible tree-encircling member having one end portion thereof engaged with one side of said casing and a free second end portion, and means for releasably locking said free second end portion to the opposite side of said casing subsequent to a positioning of the flexible member about a tree to be shaken.

13. The shaker of claim 12 wherein the means for releasably locking the second end portion of the flexible member includes power tightener means for effecting a powered tightening of the locked flexible member.

14. The shaker of claim 13 wherein said tightener means comprises an arm pivotally mounted on the second side of the casing and projecting outwardly therefrom, catch means on the outer end of said arm for selective locked engagement with the second end portion of the flexible member, and power means engaged between the second side of the casing and said arm for effecting a pivoting of the arm and a tightening of the locked flexible member.

15. The shaker of claim 14 wherein said flexible member comprises a link chain, said catch means including pivotally mounted lug means selectively engageable within selected links of said link chain.